(12) United States Patent
Coon et al.

(10) Patent No.: US 9,424,406 B2
(45) Date of Patent: Aug. 23, 2016

(54) ASSET PROTECTION BASED ON REDUNDANTLY ASSOCIATED TRUSTED ENTITLEMENT VERIFICATION

(71) Applicant: International Business Machines Corporation, Armonk, NY (US)

(72) Inventors: James R. Coon, Rochester, MN (US); Richard J. Gusefski, Endicott, NY (US); Franz Hardt, Ehningen (DE); Roger D. Krsnak, Rochester, MN (US); Jakob C. Lang, Altdorf (DE); Victor M. Lourenco, Vestal, NY (US); Jan Schneider, Holzgerlingen (DE); Garry J. Sullivan, Rochester, NY (US); Brian D. Valentine, Endwell, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 14/481,116

(22) Filed: Sep. 9, 2014

(65) Prior Publication Data
US 2016/0070893 A1   Mar. 10, 2016

(51) Int. Cl.
*H04L 9/32* (2006.01)
*G06F 21/30* (2013.01)
*G06F 17/30* (2006.01)
*G06F 21/62* (2013.01)

(52) U.S. Cl.
CPC ........ *G06F 21/305* (2013.01); *G06F 17/30368* (2013.01); *G06F 17/30522* (2013.01); *G06F 21/6218* (2013.01)

(58) Field of Classification Search
CPC ......... G06F 21/10; G06F 21/31; G06F 21/44; G06F 21/77; G06F 21/445
USPC .......... 726/17–20, 27–30, 2, 9; 713/192–193; 235/375, 487, 492, 493
See application file for complete search history.

(56) References Cited

U.S. PATENT DOCUMENTS

| | | | | |
|---|---|---|---|---|
| 6,308,270 | B1 * | 10/2001 | Guthery | ............... G06F 21/123 717/127 |
| 6,592,032 | B1 * | 7/2003 | Takaragi | ................. G06F 21/62 235/375 |
| 6,857,067 | B2 | 2/2005 | Edelman | |
| 6,990,588 | B1 * | 1/2006 | Yasukura | .............. G06F 21/316 713/155 |
| 7,086,087 | B1 * | 8/2006 | Kaminaga | ............ G06K 19/063 380/201 |
| 7,770,205 | B2 | 8/2010 | Frank | |

(Continued)

OTHER PUBLICATIONS

"Perfection in Software Protection, Integration of CodeMeter in CoDeSys V3.5" Informationsblatt, retrieved on May 13, 2014, at http://cdn.wibu.com/fileadmin/wibu/downloads/booklets/ Infoblatt_CoDeSys_CodeMeter_EN-web.pdf, 2 pages.
"Perfection in Software Protection, VxWorks EDK with WindRiver," retrieved on May 13, 2014, at http://www.wibu.com , 2 pages.

(Continued)

*Primary Examiner* — Hosuk Song
(74) *Attorney, Agent, or Firm* — Cantor Colburn LLP; William A. Kinnaman, Jr.

(57) ABSTRACT

A system and method of managing a plurality of assets by associating a smart card with a compute subsystem by installing a database on the smart card and embedding an identifier of the compute subsystem. The system and method, in turn, may receive a request to access an asset of a compute subsystem; verify that a feature of the database is enabled in response to the request, the feature corresponding to the asset; and grant the access to access the asset upon the verifying of the feature.

8 Claims, 5 Drawing Sheets

(56) References Cited

U.S. PATENT DOCUMENTS 7,877,607 B2 1/2011 Circenis et al.
2008/0270805 A1 10/2008 Kean
2010/0293536 A1 11/2010 Nikitin et al.

OTHER PUBLICATIONS

"Wibu-Systems Introduces a Fast Memory Storage Device for Copy Protection and Flexible Licensing for Embedded Systems," retrieved on May 13, 2104, at http://www.prweb.com/releases/2013/10/prweb11218753.htm , 2 pages.

* cited by examiner

ASSET PROTECTION BASED ON REDUNDANTLY ASSOCIATED TRUSTED ENTITLEMENT VERIFICATION

BACKGROUND

The disclosure relates generally to asset protection, and more specifically, to recording features of an asset that a client has paid for with a computer purchase and/or verifying entitlements to enabled features of the asset, while supporting removal of undesired features and redundancy mirroring for the enabled features.

In general, asset protection from illicit access, use, disclosure, alteration, destruction, and/or theft, resulting in loss to an organization, is a major concern in the information technology industry. An asset is any data, device, or other component of a computing environment that supports information-related activities, for example, hardware, software, and/or confidential information.

In current practice, an organization will purchase a computer system installation and pay for features that enable on-demand aspects of corresponding assets of the computer system installation (e.g., a pay as you go scheme). That is, the computer system installation is shipped with many features listed within a system-resident database, but those features only become available to the organization upon payment (e.g., by enabling or disabling features, the organization is granted more or less access to the asset corresponding to those enabled or disabled features). Further, because all available features are already present on the organization's computer system installation and because the organization only has access to the purchased features, a problem exists with protecting the system-resident database such that features that have not been purchased and/or that have been removed are not surreptitiously enabled and/or re-enabled.

SUMMARY

According to one embodiment of the present invention, a method of managing a plurality of assets comprises associating a smart card with a compute subsystem by installing a database on the smart card and embedding an identifier of the compute subsystem; receiving a request to access an asset of the compute subsystem; verifying that a feature of the database is enabled in response to the request, the feature corresponding to the asset; and granting the request to access the asset upon the verifying of the feature.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, a problem exists with protecting the system-resident database such that features that have not been purchased and/or that have been removed are not surreptitiously enabled and/or re-enabled. Thus, what is needed is a system and method for recording features of an asset that a client has paid for with a computer purchase and/or verifying entitlements to enabled features of the asset, while supporting removal of undesired features and redundancy mirroring for the enabled features.

In general, embodiments of the present invention disclosed herein may include an asset management system, method, and/or computer program product that provides an identifier-encoded database on a tamperproof device that prevents data loss, updates, removal, frame roll and mirroring of features associated with assets of a computer system installation. The tamperproof device, based on its tamper-resistant mechanism and employment of tamper-resistant management procedures via the stored database, is referred to as a trusted device. Thus, the trusted device protects a client's entitlements to the features of the database and provides the computer system installation vendor with asset protection.

For example, the asset management system, method, and/or computer program product configured to associate/couple a smart card with a compute subsystem by installing a database on the smart card and embedding an identifier of the compute subsystem; receive a request to access an asset of a compute subsystem; verify that a feature of the database is enabled in response to the request, the feature corresponding to the asset; and grant the request to access the asset upon verifying of the feature.

Systems and/or computing devices, such as an asset management system (e.g., the system embodiments 10 and 20 of FIG. 1 and FIG. 2 below), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In general, computing devices (e.g., processors 101*a*, 101*b*, 201 of FIGS. 1, 2) may include a processor (e.g., a processing unit 202 of FIG. 2) and a computer readable storage medium (e.g., a memory 205 of FIG. 2), where the processor receives computer readable program instructions, e.g., from the computer readable storage medium, and executes these instructions, thereby performing one or more processes, including one or more of the processes described herein (e.g., an asset management process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the asset management system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the asset management system and method.

Figure 1:
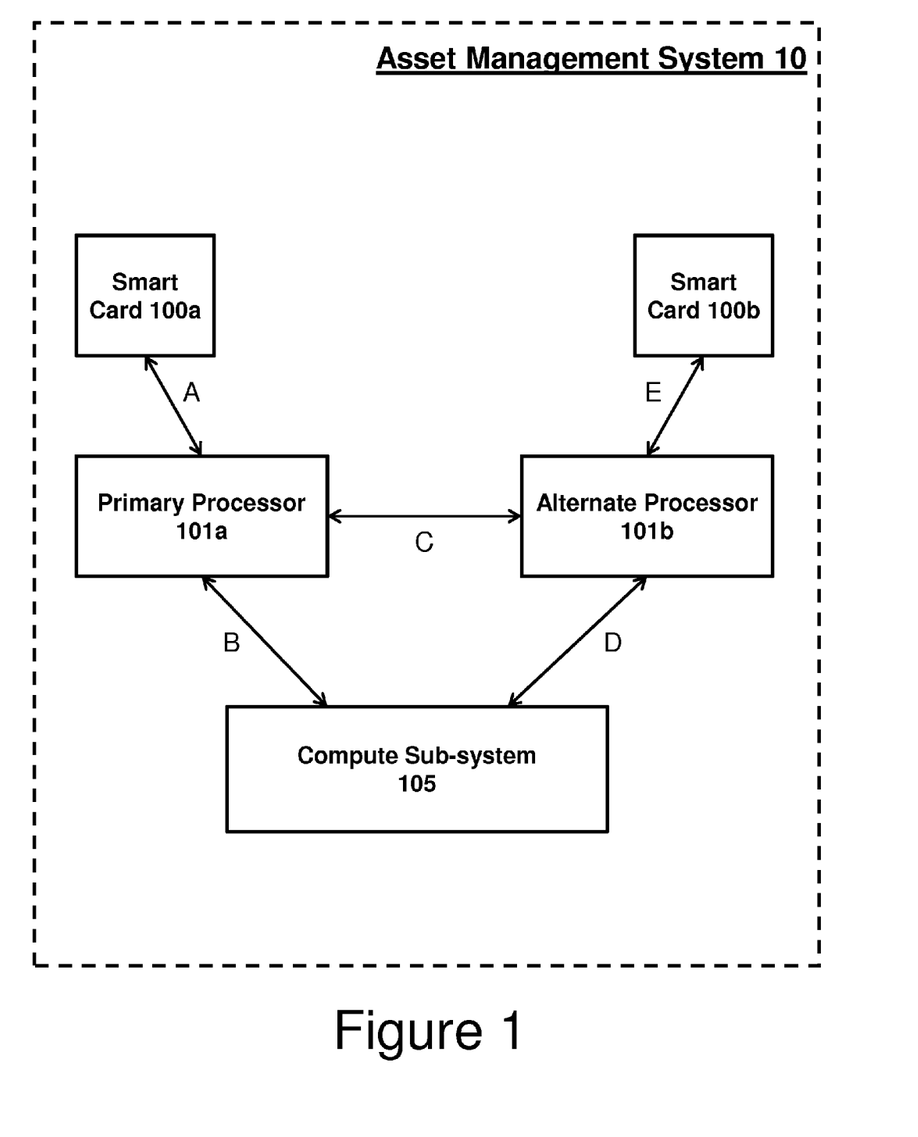
FIG. 1 is a schematic block diagram illustrating an asset management system.

In view of the above, FIG. 1 illustrates an asset management system 10 including smart cards 100a, 100b, a primary processor 101a, an alternate processor 101b, and a compute subsystem 105, each of which communicates through various connections (e.g., Arrows A-E). These items may include and/or employ any number and combination of computing devices and networks utilizing various communication technologies, as described above, that enable the asset management system 10 to provide asset protection.

The asset management system 10 securely interchanges information settings, configuration settings, blacklisting controls, and application-data updates by associating/coupling of compute subsystem 105 with a trusted device (e.g., smart cards 100a, 100b) in such a way as to make the trusted device unusable on different or uncoupled elements.

The smart cards 100a, 100b may include any card with an embedded integrated circuit, an example of which includes a FIPS140-2 hardware security device. The integrated circuits of the smart cards 100a, 100b store a database and a unique identifier (e.g., a serial number or a unique alphanumeric code assigned for identification), each of which is utilized in asset protection and management.

The database is a database, data repository or other data store and may include various kinds of mechanisms for storing, accessing, and retrieving various kinds of data, including a hierarchical database, a set of files in a file system, an application database in a proprietary format, a relational database management system (RDBMS), etc. The database may include data, e.g., a feature on demand database that stores and manages enabled features in a computer system installation. Such data may include asset configurations, such as indications of which features are enabled, disabled, etc. so that corresponding assets may be utilized or protected from use. Data may be configured, added, and/or removed from the database on the smart cards 100a, 100b through the application programming interfaces (APIs). An application programming interface (API) specifies how hardware and/or software components of the asset management system 10 should interact.

For example, during associating/coupling between the compute subsystem and a smart card, the database of the smart card is media access controlled using both a signature and an identifier of the compute subsystem contained in the database. The processor is aware of the serial number and may query the coupled smart card to verify, using that serial number, which features of the database are enabled and, by using the signature, whether those features have been tampered with.

The database of any smart card may further be mirrored to another smart card (e.g., "redundantly" associating/coupling a second smart card 100b to the compute subsystem 105) using an elliptic curve key. Elliptic curve cryptography (ECC) is an approach to public-key cryptography based on the algebraic structure of elliptic curves over finite fields. For example, by communicating via the processors 101a, 101b (e.g., Arrows A, C, E), the smart card 100a may send its public key to the smart card 100b and sign the local database with its private key. The signed database is then sent over to the smart card 100b for verification. Once verified on the smart card 100b, the database is installed, and a new signature is calculated and compared to the one embedded in the installed database on the computer system installation. In turn, the databases on the two smart cards 100a, 100b are kept synchronized by querying a timestamp of the last database update on each smart card (100*a*, 100*b*).

The smart cards 100*a*, 100*b* may further include a tamper-resistant security system (e.g., a crypto processor and/or a file system) and provide security services (e.g., protection of in-memory information). The smart cards 100*a*, 100*b* communicate with external services via card-reading devices. Thus, the processors 101*a*, 101*b* may incorporate card-reading devices that communicate with the smart cards 100*a*, 100*b*.

The processors 101*a*, 101*b* may include a general-purpose computer, with a size and capability useful for an end-user, operated directly by the end-user. The processors 101*a*, 101*b* include a computing device with a processor and a memory configured to receive and respond to a detection of the smart cards 100*a*, 100*b*. That is, the processors 101*a*, 101*b* implement APIs in cooperation with the databases of the smart cards 100*a*, 100*b* to access the assets of the compute subsystem 105.

The compute subsystem 105 may include at least one of a plurality of computers that comprise assets used for critical applications, bulk data processing, enterprise resource planning, and transaction processing. These assets are only available after verification with the database of a trusted device (e.g., the smart cards 100*a*, 100*b*).

In view of the above, an asset protection process is executed in the asset management system 10, for example, on the primary processor 100*a* using the smart card 100*a*, on which asset configurations and a serial number corresponding to the asset management system 10 (e.g., the asset configurations and the serial number corresponding to the compute subsystem 105 of the asset management system 10) are kept in a database. The asset management system 10 also enables updating of the database, verifying updates to the database, and detecting illegal update attempts to the database on the smart cards 100*a*, 100*b*. The asset management system 10 also enables retrieving the database from the smart cards 100*a*, 100*b* with tamper detection, along with secure mirroring and/or migrating the database between the smart cards 100*a*, 100*b* (e.g., from the smart card 100*a* to the smart card 100*b*).

In one operation of the asset management system 10, for example, during manufacturing of the smart cards 100*a*, 100*b*, the smart cards 100*a*, 100*b* are initialized with an applet and coupled to the compute subsystem 105 via the corresponding processors 101*a*, 101*b*. That is, feature on demand data is installed on each smart card 100*a*, 100*b* as a database, and the serial number or other unique identifier of the compute subsystem is embedded in each database of each smart card 100*a*, 100*b*. The serial number together with the signature serves as the verification mechanism for all subsequent asset access by the processors 101*a*, 101*b*. For instance, upon initiation on the primary processor 101*a* of any API that utilizes an asset of the asset management system 10, a status of a feature corresponding to that asset must be discovered (e.g., is that feature enabled or disabled). To discover the status, the serial number is utilized to gain access to the database of the smart card 100*a*. In turn, the smart card 100*a* is then read via a card reader of the primary processor 101*a* so that the serial number, which is embedded in the database, is presented to asset management system 10. If the correct serial number is presented to the asset management system 10 and the corresponding feature is discovered to be enabled, the API (e.g., and assets corresponding to the database) may be operated by the primary processor 101*a*. Note that because the smart card 100*a* is coupled to the compute subsystem 105 via the serial number, that smart card 100*a* is prevented from being used on a different system whose serial number is different (e.g., if the correct serial number is not presented, then the database will not be accessed and the corresponding asset will not be operated).

The asset management system 10 and elements therein may take many different forms and include multiple and/or alternate components and facilities. While the asset management system 10 is shown in FIG. 1, the components illustrated in FIG. 1 are not intended to be limiting. Indeed, additional or alternative components and/or implementations may be used.

Figure 2:
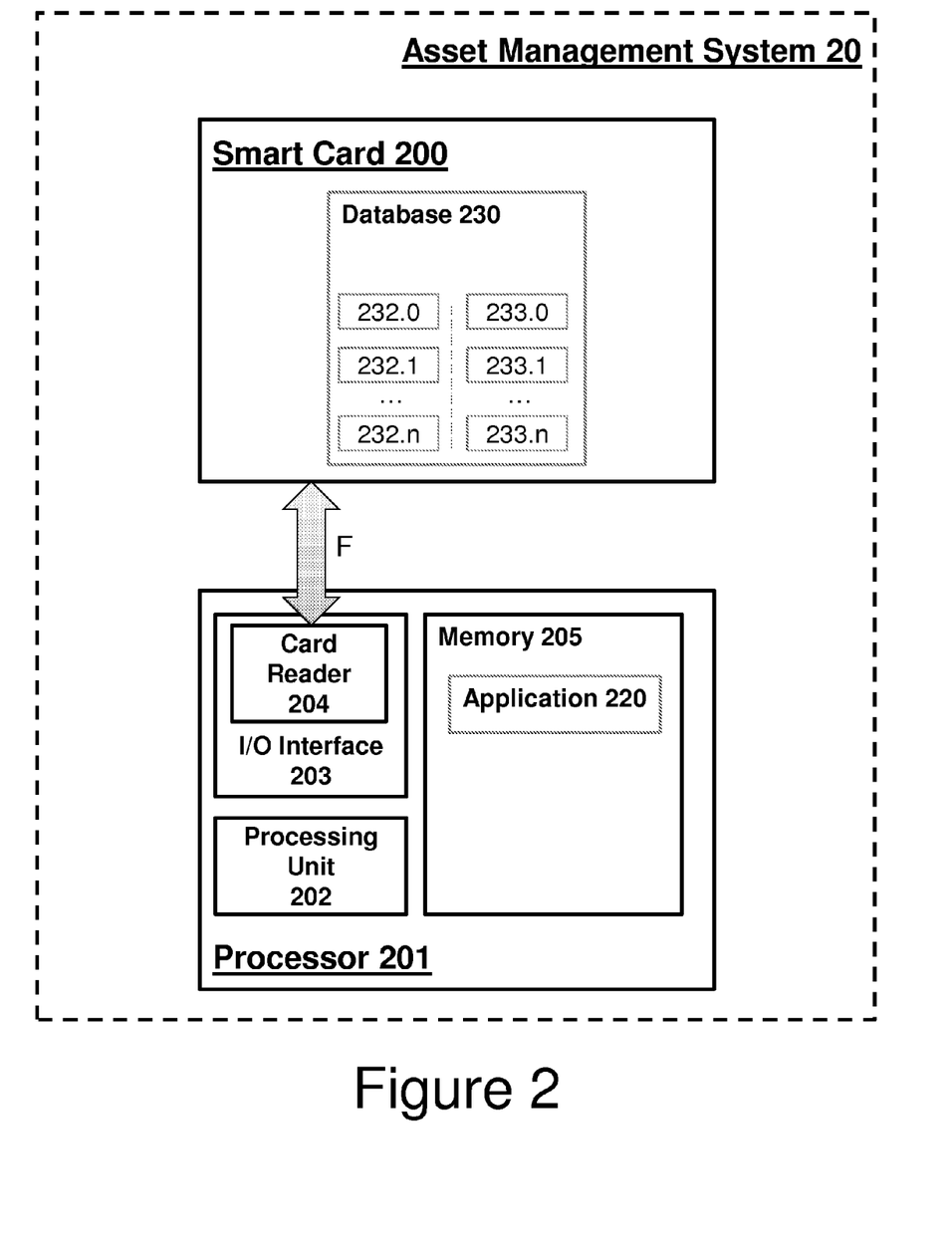
FIG. 2 is a schematic block diagram illustrating a computing device of the asset management system.

An alternate embodiment of the asset management system, method, and/or computer program product will be described with reference to FIG. 2. FIG. 2 illustrates a smart card 200 configured to communicate (e.g., Arrow F) with a processor 201 (e.g., a computing device as described above) that includes a processing unit 202, an input/output interface 203 comprising a card reader 204, and a memory 205 including an application 220, where the smart card 200 further includes a database 230 that stores features 231, 232.

The processing unit 202 may include any processing hardware, software, or combination of hardware and software utilized by the processor 201 that carries out the computer readable program instructions by performing arithmetical, logical, and/or input/output operations. The processing unit 202 may receive computer readable program instructions from the memory 205 and execute these instructions, thereby performing one or more processes defined by the application 220. Examples of the processing unit 202 include, but are not limited to an arithmetic logic unit, which performs arithmetic and logical operations; a control unit, which extracts, decodes, and executes instructions from a memory; and an array unit, which utilizes multiple parallel computing elements.

The input/output (I/O) interface 203 may include a plurality of physical and/or virtual mechanisms utilized by the processor 201 to communicate between elements internal and/or external to the processor 201 (e.g., the card reader 204). That is, the I/O interface 203 may be configured to receive or send signals or data within or for the processor 201, such as utilizing a card reader 204 to communicate with the smart card 200 (e.g., Arrow F). Another example of the I/O interface 203 may include a network adapter card or network interface configured to receive computer readable program instructions from a network and forward the computer readable program instructions, original records, or the like for storage in a computer readable storage medium (e.g., memory 205) within the respective computing/processing device (e.g., processor 201).

The card reader 204 is a data input device that reads data from the smart card 200. Examples of the card reader 204 may include an internal drive bay card reader device, a built-in smart card reader, etc.

The memory 205 may include a tangible device that retains and stores computer readable program instructions, as provided by the application 220, for use by the processing unit 202 of the processor 201.

The application 220 may include computer readable program instructions configured to securely interchange information and configuration settings, control blacklisting, and application-data updates by communicating with the coupled smart card 200. That is, the application 220 is configured to enable updating of the database 230, verify updates to the database 230, detect illegal update attempts to the database 230, retrieving the database 230 with tamper detection, along with providing secure mirroring and/or migrating the database 230 to other smart cards.

While a single item is illustrated for the application 220 (and other items) by FIG. 2, these representations are not intended to be limiting, and thus the application 220 items may represent a plurality of applications and/or application programming interfaces. For example, multiple applications in different locations may be utilized to access the assets of the asset management system 20, and in turn those same applications may be used for on-demand data retrieval. In addition, although one modular breakdown of the application 220 is offered, it should be understood that the same operability may be provided using fewer, greater, or differently named modules.

For example, although it is not specifically illustrated in the figures, the application 220 may further include multiple modules and/or application programming interfaces implementing the operations described herein. For example, an internal code module may include computer readable program instructions configured to translate commands and queries, which control asset configurations, to a smart card interface module. The API interface module may include computer readable program instructions configured to send operation commands to the database of the smart card 200 based on commands and queries received from the internal code module. A smart card interface module may include computer readable program instructions configured to integrate and verify cryptographic keys of devices and communications, such as the operation commands issued by the smart card interface module.

The database 230 may include a database, as described above, capable of storing features 230, 231. The database 230 is included within the smart card 200 (as illustrated) employing a computer operating system such as one of those mentioned above, and accessed via a network in any one or more of a variety of manners. The database 230 is a part of the smart card 200 (as illustrated in FIG. 2). The database 230 is in communication with the application 220 and/or applications external to the processor 201, such that feature configurations, information, data structures, and documents including data structures may be collected and archived in support of the processes described herein (e.g., asset protection process). As illustrated in FIG. 2, the database 230 includes a plurality of features 230, 231, illustrated as an enabled feature 230.0 to an enabled feature 230.*n* and a disabled feature 231.0 to a disabled feature 231.*n*, where 'n' is an integer representing a number of features archived by the database 230. Although one exemplary numbering sequence for the database 230 is offered, it should be understood that the same operability may be provided using fewer, greater, or differently implemented sequences.

Figure 3:
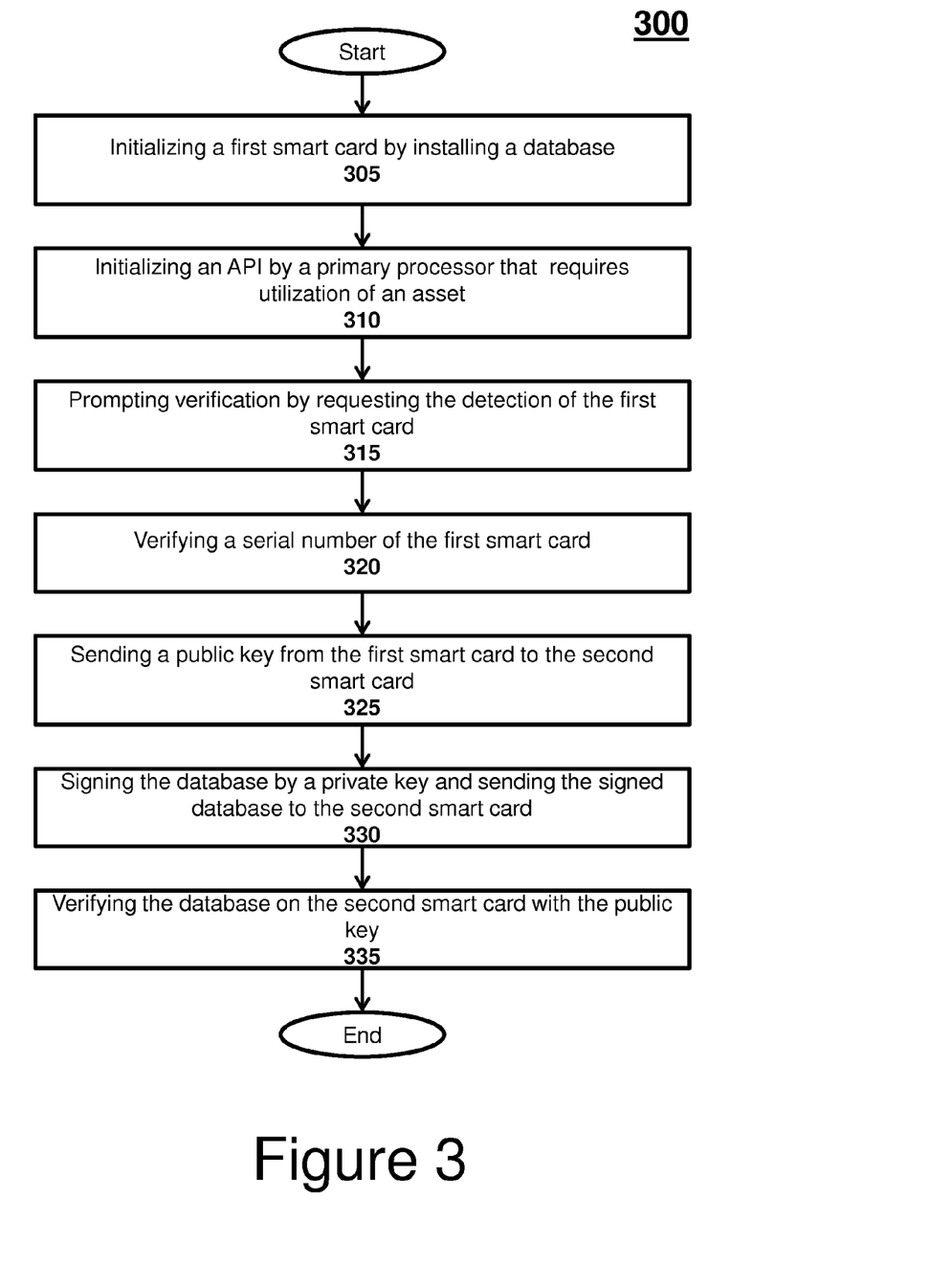
FIGS. 3-5 illustrate process flows performed by an asset management system.

The asset management system, method, and/or computer program will be described with reference to FIG. 3. FIG. 3 illustrates a process flow 300 by the asset management system 10 of installing and mirroring a database between first and second smart cards. While the process flow 300 may correspond to Arrows A-E of FIG. 1, this correspondence is not limited to the order or grouping of operation blocks of FIG. 3. In fact, the operation blocks may be executed in sequence, concurrently, or the operation blocks may sometimes be executed in the reverse order, depending upon the operability involved.

The process 300 begins at block 305 when the first smart card (e.g., 100*a*) is initialized by installing (e.g., Arrow A) via a primary or first processor (e.g., 101*a*) the database that includes a serial number of an asset management system (e.g., 10), thereby associating/coupling the first smart card 100*a* with the compute subsystem 105. At block 310, the first processor (e.g., 101*a*) initializes an API that requires the use of an asset (e.g., processing resources) on a compute subsystem (e.g., 105). The first processor prompts for verification, at block 315, by requesting the detection of the first smart card. At block 320, the first smart card is read via a card reader of the first processor so that the serial number, which is embedded in the database, is verified. This enables the API to access (e.g., Arrow B) the processing resources of the compute subsystem so that the API may perform a mirroring process of the database from the first smart card to a second smart card (e.g., 100*b*).

Next, as illustrated by blocks 325-335, the database of the first smart card is mirrored to the second smart card so that both the first and second smart cards are "redundantly" coupled to the compute subsystem. For instance, the first smart card sends, at block 325, a public key to the second smart card (e.g., Arrow A, C, E). Then, at block 330, the database is signed by a private key of the first smart card and sent over to the second smart card (e.g., Arrow A, C, E). The second smart card, at block 335, then verifies the database by utilizing the previously received public key. Once verified, the database is installed on the second smart card, and a signature is calculated and compared to the one embedded in the database. The databases on the first and second smart cards are kept synchronized by querying a timestamp of the last database update on each smart card. In addition, due to this synchronization, the second smart card may allow a second processor (101*b*) to access assets of the compute subsystem. Then, the process 300 ends.

Figure 4:
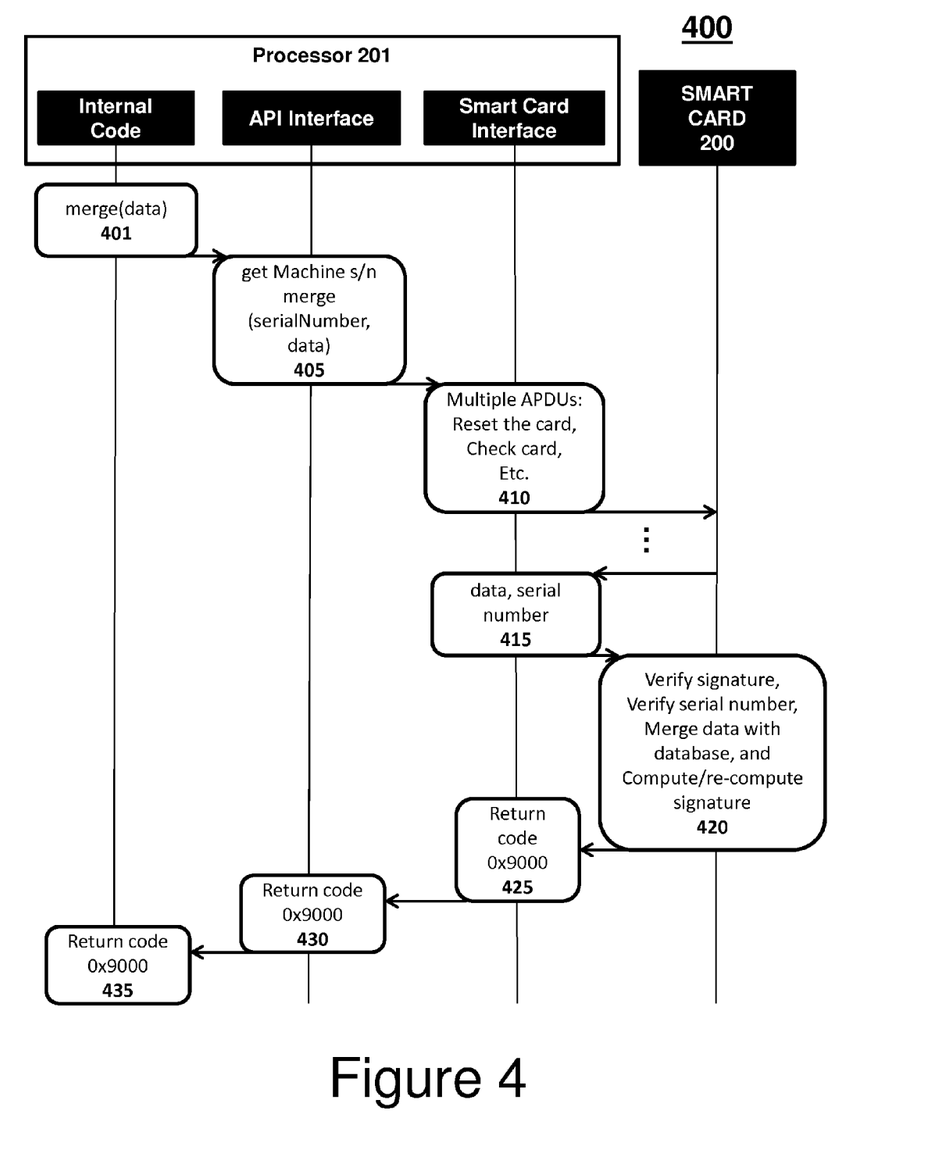
Figure 5:
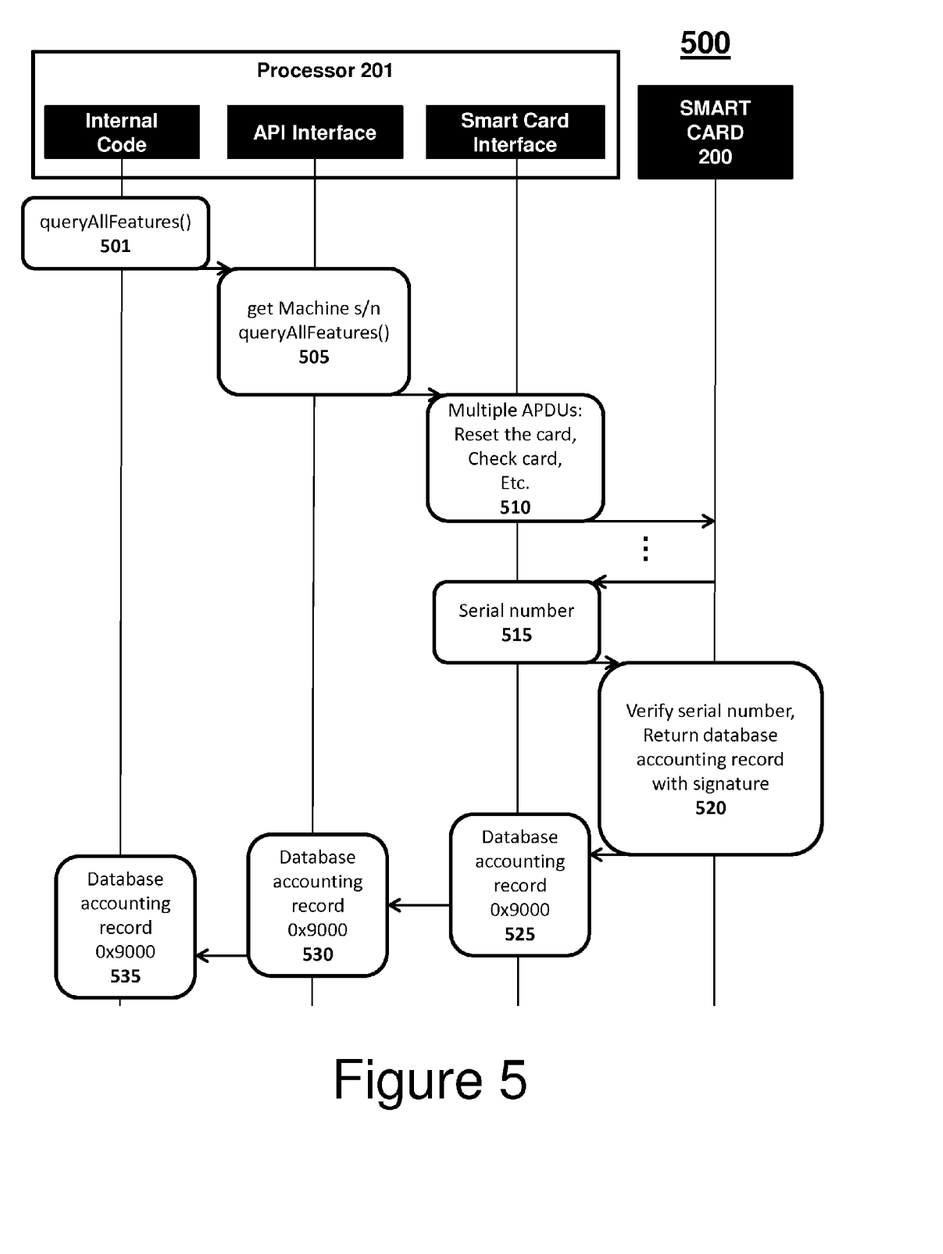

The asset management system, method, and/or computer program will be described with reference to FIGS. 4-5. FIGS. 4-5 illustrate an update process flow 400 to the database 230 on the smart card 200, which is then followed by a query process flow 500 of the updated database.

The process flow 400 begins at block 401 when, in response to a user input at a processor (e.g., 201), an internal code of an application (e.g., 220) sends a merge command (e.g., 'merge(data)') to an API interface, which initiates an update process for the database of the smart card (e.g., 200) with merge data. The merge data may include asset configurations, such as the enablement, disablement, addition and/or removal of features (232, 233) of the database. At block 405, the API interface combines the merge command with a query for the serial number of the compute subsystem and issues the merge command (e.g., 'merge(serialNumber, data)').

Next, at block 410, a smart card interface receives or intercepts the merge command so as to issue (e.g., Arrow F) application protocol data units (APDUs), which are communication units between a card reader implementation (e.g., 204) and a smart card, corresponding to the merge command to the smart cart. Examples of APDUs between the card reader implementation and the smart card include resetting the smart card, checking the smart card, etc. In response, at block 415, the card reader receives (e.g., Arrow F) a status of the database to the processor (e.g., 'data, serial number') from the smart card. With the status received, the processor verifies at block 420 portions of the status to confirm that a correct smart card is present. That is, the processor verifies that the detected smart card has been previously coupled to the compute subsystem. For example, both a signature and the serial number embedded in the status are verified by the processor. If the verification discovers that the correct smart card has been presented, the merge data is communicated (e.g., Arrow F) to the smart card and the database is updated. Further, a signature is newly computed. The newly computed signature is then forwarded to the smart card interface, the API interface, and the internal code, as illustrated by blocks 425, 430, 435, so that the updated database may be accessed at a later time, such as in the query process flow 500.

With the update to the database on the smart card 200 complete, the asset management system 20 will next verify what features 232, 233 of the updated database are enabled, disabled, etc. with a query, as illustrated by the process flow 500. The process flow 500 begins at block 501 when, in response to a user input at the processor (e.g., 201), the internal code of the application (e.g., 220) sends a query command (e.g., 'queryAllFeatures( )') to the API interface, which initiates a query process for data of the database of the smart card (e.g., 200). At block 505, the smart card interface includes with the query command a request for the serial number of the compute subsystem (e.g., 'queryAllFeatures( )').

Next, at block 510, the smart card interface receives or intercepts the query command so as to issue (e.g., Arrow F) application protocol data units (APDUs) corresponding to the query command to the smart cart. In response, at block 515, the card reader receives (e.g., Arrow F) the serial number from the smart card. With the serial number received, the processor verifies at block 520 the serial number to confirm that it is communicating with a correct smart card. Once the verification is complete, the features are communicated (e.g., Arrow F) from the smart card along with a signature (e.g., 'Return database accounting record with a signature'). The features are then forwarded to the smart card interface, the API interface, and the internal code, as illustrated by blocks 525, 530, 535, so that the processor will ascertain which features of the updated database are enabled, disabled, etc.

Thus, the serial number of the asset management system, by being embedded in the database, is passed in on an initial application programming interface which loads an applet on the smart card, and is passed in on every subsequent application programming interface and serves as a three-way verification mechanism for all subsequent smart card accesses. By embedding the serial number into the database and requiring the serial number on all API interfaces, a "coupling" of the system to the smart card via a processor is made. This prevents the smart card from being used on a different system whose serial number is different, protects a client's entitlements to the system, and provides the system provider with asset protection, each of which is otherwise unavailable in the current solution utilized by the information technology industry.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for managing a plurality of assets, the computer program product comprising a non-transitory computer readable storage medium having program instructions embodied therewith, the program instructions executable by a processing unit of a processor to cause the processing unit to:
   connect a smart card with a compute subsystem, wherein the smart card has a database and an identifier of the compute subsystem thereon;
   receive a request to access an asset of the compute subsystem;
   verify that a feature of the database is enabled in response to the request by querying the database by
      detecting the smart card via a card reader of the processor,
      verifying that an identifier passed in on an application programming interface to the smart card matches the identifier of the compute subsystem, and
      in response to the verifying of the identifier passed in on the application programming interface to the smart card, querying the database for a status of the feature that corresponds to the asset,
      wherein the status indicates whether the feature is enabled or disabled,
      wherein the feature corresponds to the asset;
   grant the request to access the asset upon the verification of the feature;
   associate the smart card with the compute subsystem by installing the database on the smart card and embedding the identifier of the compute subsystem.

2. The computer program product of claim 1, wherein the identifier directly corresponds to the compute subsystem;
   wherein the identifier uniquely associates the smart card with the compute subsystem.

3. The computer program product of claim 1, wherein the program instructions are further executable by the processing unit to cause the processing unit to:
   update the database with merge data and removal of features in the database.

4. The computer program product of claim 1, wherein the program instructions are further executable by the processing unit to cause the processing unit to:
   mirror the database from the smart card, which is a first smart card, to a second smart card, the second smart card being associated with the compute subsystem.

5. A system for managing a plurality of assets, comprising:
   a smart card; and
   a processor configured to:
      connect a smart card with a compute subsystem, wherein the smart card has a database and an identifier of the compute subsystem thereon;
      receive a request to access an asset of the compute subsystem;
      verify that a feature of the database is enabled in response to the request by querying the database by
         detecting the smart card via a card reader of the processor,
         verifying that an identifier passed in on an application programming interface to the smart card matches the identifier of the compute subsystem, and
         in response to the verifying of the identifier passed in on the application programming interface to the smart card, querying the database for a status of the feature that corresponds to the asset,
         wherein the status indicates whether the feature is enabled or disabled,
         wherein the feature corresponds to the asset;
      grant the request to access the asset upon the verification of the feature; and
      associate the smart card with the compute subsystem by installing the database on the smart card and embedding the identifier of the compute subsystem.

6. The system of claim 5, wherein the identifier directly corresponds to the compute subsystem;
   wherein the identifier uniquely associates the smart card with the compute subsystem.

7. The system of claim 5, wherein the processor is further configured to:
   update the database with merge data and removal of features in the database.

8. The system of claim 5, wherein the processor is further configured to:
   mirror the database from the smart card, which is a first smart card, to a second smart card, the second smart card being associated with the compute subsystem.

* * * * *